July 2, 1957 J. E. SVABEK, JR 2,797,578
DEPTH MEASURING DEVICE
Filed Oct. 18, 1954 2 Sheets-Sheet 2

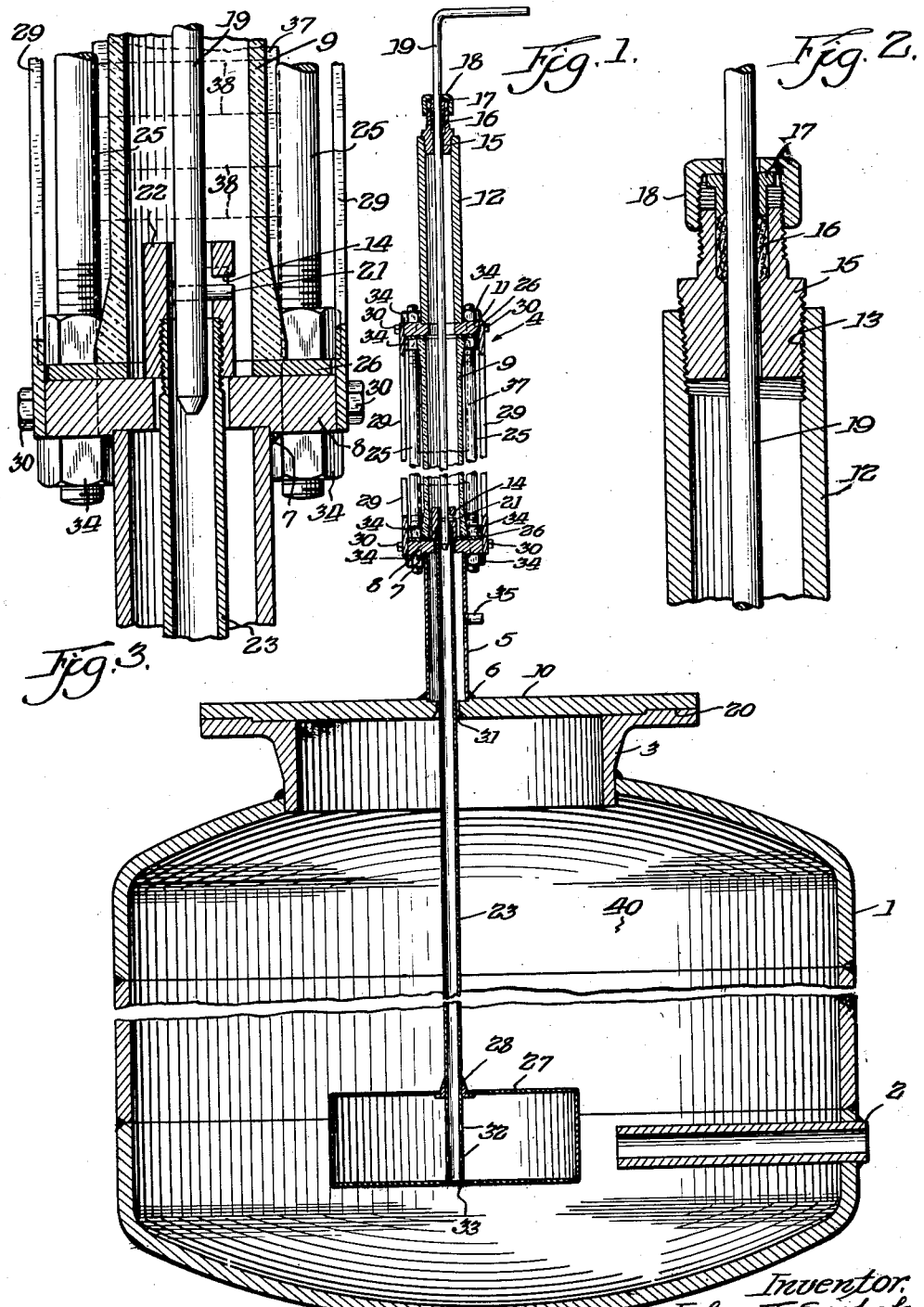

Inventor.
John E. Svabek, Jr.
By Joseph O. Lange
Atty.

United States Patent Office 2,797,578
Patented July 2, 1957

2,797,578

DEPTH MEASURING DEVICE

John E. Svabek, Jr., Chicago, Ill., assignor to Crane Co., Chicago, Ill., a corporation of Illinois Application October 18, 1954, Serial No. 462,727

3 Claims. (Cl. 73—322)

The present invention relates to an improved depth measuring device and more particularly pertains to a novel gauge particularly adapted to measure the levels of molten metals preferably, but not necessarily, maintained under an inert atmosphere.

It should be noted at the outset that the measuring of the depth of molten metals presents a multitude of problems not usually confronted in the measurement of ordinary fluid levels. Some metals in the molten state, such as magnesium, for example, ignite with the element oxygen of the atmosphere and burst into flame; consequently magnesium must be kept under an oxygen free or inert atmosphere. This obviously necessitates a closed vessel in which the liquid level of the molten metal therewithin may best be detected by means of a float member. It will be obvious that if an accurate determination on volume is desired, a calibrated rod member may be employed, preferably affixed to the float member.

It is therefore one of the principal objects of my invention to provide a novel device capable of measuring the volume of molten metal contained in a closed vessel at any given instant.

It is a further object of my invention to enable my apparatus to function while guarded by a novel safety feature, the details of which will hereinafter be explained in greater detail.

It is a still further object of my invention to provide a measuring device which is both efficient and accurate in operation while being both inexpensive to manufacture and easily constructed.

These and other objects of my invention will become more readily apparent upon proceeding with the following detailed description read in the light of the accompanying drawings, in which:

Fig. 1 is a sectional view of my invention shown incorporated with a molten metal bath receptacle.

Fig. 2 is a fragmentary enlarged detailed section of the stuffing box affixed to the upper end limit of the indicator superstructure.

Fig. 3 is a fragmentary enlarged detailed section of the lift rod member engaging the indicator nut affixed to the top end limit of the indicator rod.

Similar reference numerals refer to similar parts throughout the several views.

Figure 4:
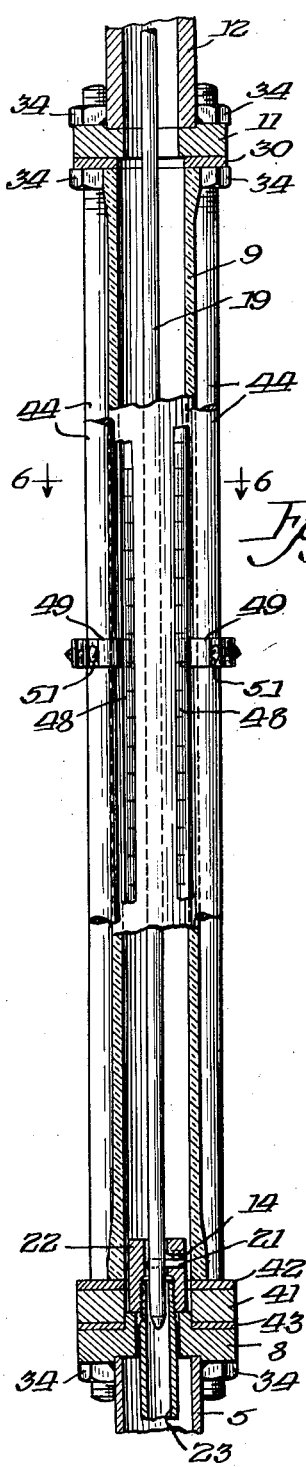
Fig. 4 is a view of a modified form in partial section.

Referring now to Fig. 1, container vessel 1 for molten metal or the like is shown having the outlet 2 which may suitably engage a valve or other control mechanism of which is positioned in the bottom portion thereof whereby the molten metal may emerge from the vessel in the normal course of operation. It is, of course, obvious that the rate of molten metal used is of the utmost importance in many chemical reactions and mechanical operations.

The flanged neck portion 3 is welded as illustrated to the upper centrally apertured portion of the container vessel 1. The flanged neck portion 3 also cooperates with the support plate 10 and effects a fluid-tight seal therewith by means of the shouldered ground joint 20. In the normal course of operation, clamp members or other suitable means (not shown) maintain the opposed flanged surfaces of the members 10 and 3 in close abutting fluid-tight relationship.

The vessel indicator superstructure generally designated 4 comprises the support pipe member 5 welded at the bottom end limit 6 to the support plate 10, and is welded at the upper end limit 7 to the flange member 8. A high temperature resistant transparent pipe member 9 is interposed between the flange members 8 and 11, the upper flange member 11 being welded or otherwise suitably affixed to the pipe housing member 12. The pipe housing member 12 is also tapped at its upper end limit 13, more clearly shown in Fig. 2, to threadedly engage the stuffing box assembly comprising the centrally apertured nut member 15 having the packing housing chamber 16 incorporated therein, gland member 17 superposed above said packing, and packing nut member 18 threadedly engaging the upper portion of the nut member 15.

The lift rod member 19 is maintained in an elevated position, while float member 27 is enabled to freely move axially on the liquid surface of the molten metal, by tightening the packing nut 18. The latter nut member may also be used for maintaining the entire float assembly in an elevated position after the desired amount of molten metal has been used and the remaining portion commences to harden and cool. Other suitable means such as a set screw may be used for maintaining the float member assembly in an elevated position.

Figure 5:
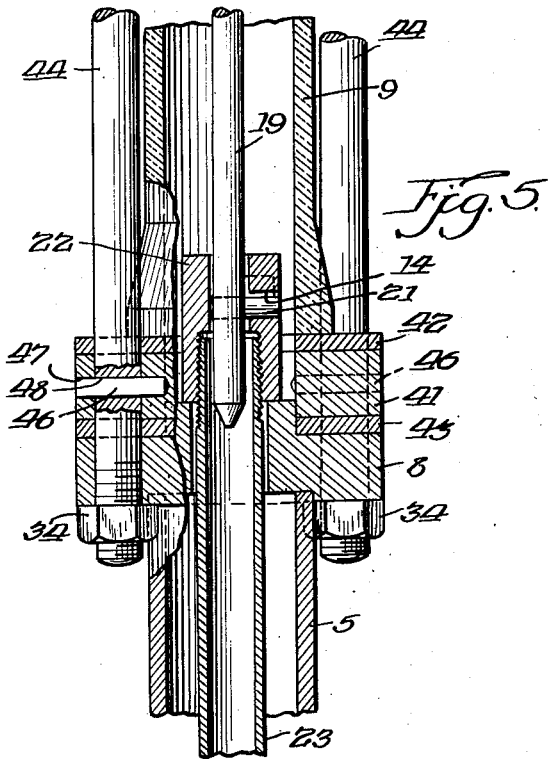
Fig. 5 is an enlarged sectional view of a lower portion thereof.
Figure 6:
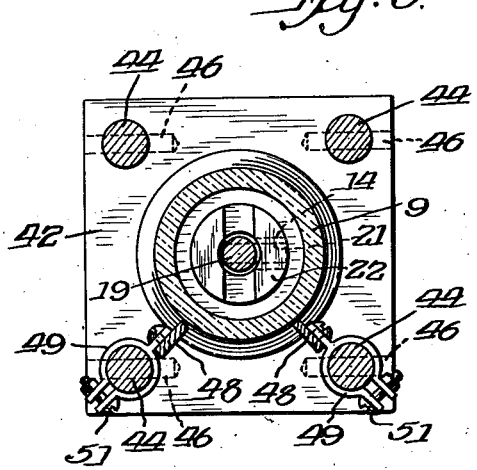
Fig. 6 is a transverse sectional view taken on the line 6—6 of Fig. 4.

Referring now to the modification shown in Figs. 4 to 6 inclusive, and specifically to Fig. 4, the form of my device therein illustrated is directly to the superstructure comprising the transparent pipe member 9 and the superposed pipe housing member 12 may be removed as a unit from the support pipe 5. The ease of disassembly presented by the illustrated structure of Fig. 4 lessens the chance of breakage or distortion of the component parts in the event of replacement or repair.

The structure of Fig. 4 differs from that of Fig. 1 in that an auxiliary flange member 41 engages the transparent pipe member 9 in a fluid sealing manner by means of the interposed gasket member 42 and similarly engages flange member 8 by means of the interposed gasket member 43. As is clearly noted in Figs. 5 and 6, a fixed relationship between the rods 44 and flange 41 is maintained by means of the pin members 46 which are driven into the apertures 47 of the flange member 41 and aligned apertures 48 of the tie rods 44.

The tie rod members 44 and that portion of the superstructure 4 positioned above the flange member 8 is securely affixed to the latter flange member by means of the nut members 34 which are drawn up tight against the bottom surface of the flange 8.

It is thus apparent that the portion of the illustrated apparatus positioned above the flange member 8 may be detached therefrom as a unit by the single expedient of removing the nut members 34. Utilizing the structure illustrated in Fig. 4, the supports 29 of Figs. 1 and 3 are unnecessary as the removal of the superstructure as a unit having a firm base, consisting of the auxiliary flange 44 obviates the possibility of twisting or other distorting movement.

It will be noted that the lift rod member 19 may be suitably bent as shown at its upper end portion to facilitate handling thereof and has pin member 21 affixed to its lower end portion for purposes of engaging the slotted portion 14 of indicator nut 22 more clearly seen in Fig. 3. The top end portion of the indicator rod 23 threadedly engages the indicator nut member 22, the latter nut member shouldering on flange member 8 after reaching the lower end limit of its axial movement. The opposed flange members 8 and 11 have the tie-rods 25 interposed therebetween and are maintained in fluid-sealing relationship with the transparent pipe member 9 by means of the nut members 34 which cooperate with the tie-rods 25 in effecting fluid sealing compression forces and the gasket members 26 which are interposed between the flange member surfaces and the opposed peripheries of the transparent member 9. Steel supports 29 are secured to flange members 8 and 11 by means of the bolts 25 to add rigidity to the superstructure 4. The supports in combination with scale 37 function as protectors for pipe 9.

The indicator rod member 23 is welded or otherwise suitably attached at its lower end limit to float member 27. The latter float member comprises an air-tight receptacle preferably composed of carbon steel. The weld 28 is beveled to a predetermined angle to engage recess 31 of cover plate 10 in a fluid sealing relationship when the float member 27 has been elevated to the upper end limit of its axial movement. It will be noted that this valve feature presents an added factor of safety when the molten metal must be secured free from the atmosphere. Consequently, in the event of any leak in the indicator superstructure 4, the float member 27 may be quickly raised, shutting off the internal chamber 40 of the container vessel from the gases of the atmosphere. It is obvious that in the course of elevating the float member 27 inert gas inlet 35 will continue to supply an over pressure of inert gas depending upon the nature of the leak preventing the entrance of contaminating gases until the tapered weld valve 28 has seated in recess 31.

In addition, it will be noted that the portion of the indicator rod 23 contained in the float member 27 is perforated as at 32 to enable any entrapped gases contained therein to readily escape upon expansion occasioned by the heat of the molten metal. The bottom of the float member 27 is perforated as at 33 in initial construction to enable a weld to be effected between the float member and the indicator rod in the process of assembly.

In the normal course of operation, a vacuum pump is connected to inlet 35 exhausting the air therein, and inert gas is then allowed to enter chamber 40. Float member 27 and attached indicator rod are then lowered to the solid surface of the cooled metal. The lift rod member 19 is then disengaged from the slotted portion 14 of indicator nut 22 and elevated to a fixed position. The indicator rod and float member are then enabled to freely float on the liquid surface of the molten metal after heat has been applied to the container vessel 1. A calibrated scale member 37 is suitably fixed to the flange members 8 and 11 (see Fig. 3). The indicator rod 23 is appropriately notched or otherwise marked so as to be clearly seen through the transparent pipe member 9, therefore giving an arcuate measurement of the liquid level in the container 1 by reading the rod relative to the markings 38 on scale member 37. Rates of flow and volumes consumed of the liquid metal may be readily and accurately determined by a close reading of the markings on the indicator rod shaft, clearly seen through the transparent pipe member 9, relative to the scale member 37.

Upon cessation of the operation, the lift rod member is once more readily engaged to the indicator nut member by lowering the lift rod member until the pin 21 engages the slotted portion 14 in the indicator nut, as is more clearly seen in Fig. 2. It is apparent that a number of methods may be used for retaining the lift rod member in an elevated position, enabling the detached indicator rod member to freely move axially with the liquid surface. Among the methods of retention are set screws, tightening of the packing nut, locking strips and the like. The locking means is also used upon cessation of operations to keep the indicator rod and attached float member 27 in an elevated position while the remaining metal in the receptacle hardens.

Means other than the manual manipulation of the lift rod member 19 may obviously be employed in retracting the float member 27 from the container receptacle 1. For example, an electromagnet concentric member with the indicator rod member 23 may reciprocally move on a track positioned about said transparent pipe member 9 thereby moving the indicator rod 23 and attached float member 27 into the desired position by virtue of the magnetic attraction exerted on the ferrous indicator rod member 23.

As to the modified forms shown in Figs. 4 to 6 inclusive, there is illustrated an alternate form of gauge comprising the twin scale members 48 which are secured to the opposed tie rod members 44 by means of the split clamp members 49 and which are held in tight frictional engagement with the tie rods 44 by means of the nut and bolt members 51. The indicator rod reading is therefore easily made by merely a glance at the transparent pipe member 9 and the adjacent scale members 48.

It is thus apparent to those skilled in the art, that I have presented a device for measuring the liquid level of a molten metal which is both unique and efficient in operation. In addition, the apparatus employed is both easy to construct and economical to assemble.

It is further apparent that many changes in the details of construction of my invention may be effected, while remaining within the spirit of my invention as determined by the appended claims.

I claim:

1. In a device for measuring the liquid level of a molten metal or the like in a closed receptacle, a hollow float member having a hollow indicator rod affixed thereto in fluid-tight engagement, the said float member adapted to float on the liquid surface of the molten metal in the normal course of operation, said receptacle for said molten metal having a neck portion, a centrally apertured supporting plate member affixed to the neck portion in fluid-tight engagement, a supporting pipe member suitably affixed to the periphery of the aperture of said supporting plate member, a transparent pipe member superposed above said supporting pipe member in fluid-tight engagement with said supporting pipe member at its lower end limit, a pipe housing member, the said pipe member being mounted in fluid-tight engagement with said pipe housing member, the latter member being superposed above said transparent pipe member, the upper end limit of said pipe housing member having a stuffing box affixed thereto, a lift rod member reciprocally movable in the said pipe housing member and engaging said stuffing box member, a pin member affixed to the lower end portion of said lift rod member, a slotted nut portion affixed to the upper end limit of said indicator rod member and removably engaging said pin member, means maintaining the said lift rod member in an elevated position, and an inlet cooperating with said supporting pipe member.

2. In a device for measuring the liquid level of a molten metal or the like in a closed receptacle, a hollow float member having a hollow indicator rod affixed thereto in fluid-tight engagement, the said float member adapted to float on the liquid surface of the molten metal in the normal course of operation, said receptacle for said molten metal having a neck portion, a centrally apertured supporting plate member affixed to the neck portion in fluid-tight engagement, axially aligned superposed flange members above the said supporting plate member, a supporting pipe member suitably affixed to the periphery of the aperture of said supporting plate member, a transparent pipe member superposed above said supporting pipe member in fluid-tight engagement with said supporting pipe member at its lower end limit, the said transparent pipe member being interposed between said flange members, a pipe housing member, the said pipe member being mounted in fluid-tight engagement with said pipe housing member, the upper one of said flange members being connected to the said pipe housing member, the latter member being superposed above said transparent pipe member, support means attached to the said flange members, the upper end limit of said pipe housing member having a stuffing box mounted thereon, a lift rod member reciprocally movable in the said pipe housing member and engaging said stuffing box, a pin member mounted on a lower portion of said lift rod member, slotted nut means affixed to the upper end limit of said indicator rod member removably engaging said pin member, and an inlet cooperating with said supporting pipe member.

3. In a device for measuring the liquid level of a molten metal or the like in a closed receptacle, a hollow float member having a hollow indicator rod affixed thereto in fluid-tight engagement, the said float member adapted to float on the liquid surface of the molten metal in the normal course of operation, said receptacle for said molten metal having a neck portion, a centrally apertured supporting plate member affixed to the neck portion in fluid-tight engagement, a vertically extending supporting pipe member affixed to the said supporting plate member, a flange member attached to the said supporting pipe member, a transparent pipe member superposed above said supporting pipe member in fluid-tight engagement with said supporting pipe member at its lower end limit, an auxiliary flange engaging said transparent pipe member in fluid sealing relationship, a pipe housing member, the said pipe member being mounted in fluid-tight engagement with said pipe housing member, the latter member being superposed above said transparent pipe member, the upper end limit of said pipe housing member having a stuffing box affixed thereto, a lift rod member reciprocally movable in the said pipe housing member and engaging said stuffing box member, a pin on the lower end portion of said lift rod member, slotted means affixed to the upper limit of said indicator rod member engaging said pin member, tie-rods fixedly engaging said auxiliary flange member, the said first named flange member being secured to the said auxiliary flange whereby the superstructure comprising the said transparent pipe member and the said pipe housing member may be removed as a unit from the said supporting pipe member.

References Cited in the file of this patent

UNITED STATES PATENTS

| | | |
|---|---|---|
| 246,718 | Cable | Sept. 6, 1881 |
| 588,605 | Robinson | Aug. 24, 1897 |
| 1,439,969 | Mhoon | Dec. 26, 1922 |
| 1,581,440 | Hammerstrom | Apr. 20, 1926 |
| 2,043,364 | Arntzen | June 9, 1936 |
| 2,233,235 | Witthaus | Feb. 25, 1941 |

FOREIGN PATENTS

| | | |
|---|---|---|
| 1,507 | Great Britain | May 27, 1857 |
| 675,098 | France | Oct. 3, 1928 |